United States Patent [19]

Sugano

[11] Patent Number: 4,601,233
[45] Date of Patent: Jul. 22, 1986

[54] HYDRAULIC SERVO DEVICE WITH BUILT-IN ACCUMULATOR

[75] Inventor: Kazuhiko Sugano, Yokohama, Japan

[73] Assignee: Nissan Motor Co., Ltd., Yokohama, Japan

[21] Appl. No.: 658,218

[22] Filed: Oct. 5, 1984

[30] Foreign Application Priority Data

Oct. 14, 1983 [JP] Japan ................. 58-190871

[51] Int. Cl.$^4$ ..................... F01B 7/00; F01B 7/20
[52] U.S. Cl. ......................... 92/52; 92/60; 92/63; 92/152
[58] Field of Search .............. 92/50, 52, 60, 63, 69, 92/75, 152

[56] References Cited

U.S. PATENT DOCUMENTS

| | | | |
|---|---|---|---|
| 2,633,712 | 4/1953 | Sheppard | 92/63 X |
| 2,966,888 | 1/1961 | Jania et al. | 92/63 X |
| 3,241,464 | 3/1966 | Pierce, Jr. | 92/60 |
| 3,353,637 | 11/1967 | Chana | 188/152 |
| 3,450,005 | 6/1969 | Ellis | 92/52 X |
| 3,650,162 | 3/1972 | Leising et al. | 74/867 |

FOREIGN PATENT DOCUMENTS 2077374 12/1981 United Kingdom.

OTHER PUBLICATIONS

Forier, L. C., et al, editors, *Motor Automatic Transmission Manual*, 8th ed., New York: Motor, The Hearst Corp., 1979.

Primary Examiner—Robert E. Garrett
Assistant Examiner—George Kapsalas
Attorney, Agent, or Firm—Schwartz, Jeffery, Schwaab, Mack, Blumenthal & Evans

[57] ABSTRACT

A hydraulic servo device with a built-in accumulator, comprising a servo piston fit in a servo cylinder and connected via a stem to a band brake, an accumulator piston having a large diameter outer diameter portion and a small diameter outer diameter portion fit in the servo cylinder at two inner diameter portions thereof having different diameters and an inner diameter portion fit around a small diameter outer diameter portion of the servo piston, and an accumulator piston spring biasing the accumulator piston toward the servo piston. A servo release pressure acts on a pressure acting area defined by a large diameter outer diameter portion of the servo piston, a servo apply pressure acts on a pressure acting area defined between the large diameter outer diameter portion the servo piston and the small diameter outer diameter portion thereof, and an accumulator pressure acts on a pressure acting area defined between the large diameter outer diameter portion of the accumulator piston and the small diameter outer diameter portion thereof.

1 Claim, 2 Drawing Figures

HYDRAULIC SERVO DEVICE WITH BUILT-IN ACCUMULATOR

BACKGROUND OF THE INVENTION

The present invention relates to a hydraulic servo device with a built-in accumulator.

In hydraulic control systems for automatic transmissions, an accumulator is used to dampening a rise in hydraulic fluid pressure and the like. However, the accumulator piston is large in diameter and needs a long stroke, thus demanding a relatively large space. A hydraulic servo device with a built-in accumulator as shown in FIG. 1 is known which has an accumulator arranged in the same place as a servo piston for actuating a band brake in order to provide a compact arrangement as one measure to solve the above problem. This hydraulic servo device is used in an automatic transmission called "Hydra-matic 400" manufactured by GM. A servo piston 12 has an outer diameter portion fit in a large diameter inner diameter portion 10 of a servo cylinder and an inner diameter portion fit around a large diameter outer diameter portion of an accumulator piston 14. A small diameter outer diameter portion of the accumulator piston 14 is fit in a small diameter inner diameter portion 16 of the servo cylinder. The servo piston 12 is connected to a stem 18. Arranged around the stem 18 are a spring 20 for the accumulator piston 14 and another spring 22 for the servo piston 12. This construction defines a servo apply chamber 24, a servo release chamber 26 and an accumulator chamber 28. A brake adapted to be applied by this servo piston 12 is a band brake for a first speed ratio in L range and thus hydraulic fluid pressure is supplied to the servo apply chamber 24 at the first speed ratio in L range. Thus, no hydraulic fluid pressure is supplied to the servo apply chamber 24 during shifting in D range. Hydraulic fluid pressure is always supplied to the accumulator chamber 28 in D range. Hydraulic fluid pressure is supplied to the servo release chamber 26 at a second speed ratio. Thus, the hydraulic fluid pressure within the servo release chamber 26 gradually rises in shifting from the first to second speed ratio in D range thereby to suppress substantial shift shocks because the accumulator piston 14, which assumes a pressed down position as viewed in FIG. 1, moves upwards as viewed in FIG. 1 owing to the second speed ratio hydraulic fluid pressure supplied to the servo release chamber 26. However, this hydraulic servo with built-in accumulator poses a problem as follows. That is, the accumulator cannot have sufficiently large volume because a pressure acting area of the servo release chamber 26 is relatively small and the accumulator piston 14 is fit in inner diameter portion of the servo piston 12. As a result, a sufficiently effective softening of hydraulic pressure rising cannot be obtained.

SUMMARY OF THE INVENTION

An object of the present invention is to provide a hydraulic servo device with a built-in accumulator which provides the accumulator with a sufficiently large volume within a limited size of the device.

The present invention has accomplished the above object by arranging an accumulator piston around a servo piston. According to the present invention, a hydraulic servo device with a built-in accumulator comprises:

a servo cylinder formed with a first inner diameter portion, a second inner diameter portion and a third inner diameter portion, the first inner diameter portion having the largest diameter, the second inner diameter portion having a diameter larger than the third inner diameter portion and the third inner diameter portion having the smallest diameter;

a servo piston having a large diameter outer diameter portion fit in the first inner diameter portion of the servo cylinder and a small diameter outer diameter portion;

an accumulator piston having a large diameter outer diameter portion fit in the second inner diameter portion of the servo cylinder and a small diameter outer diameter portion fit in the third inner diameter portion of the servo cylinder, the accumulator piston having an inner diameter portion fit around the small diameter outer diameter portion of the servo piston; and an accumulator piston spring biasing the accumulator piston toward the servo piston;

the large diameter outer diameter portion of the servo piston cooperates with the first inner diameter portion of the servo cylinder to define a first pressure acting area which is adapted to receive a servo release pressure;

the large diameter outer diameter portion of the servo piston and the small diameter outer diameter portion thereof defining therebetween a second pressure acting area which is adapted to receive a servo apply pressure;

the large diameter outer diameter portion of the accumulator piston and the small diameter outer diameter portion thereof defining therebetween a third pressure acting area which is adapted to receive an accumulator pressure.

DESCRIPTION OF PREFERRED EMBODIMENT

Figure 1:
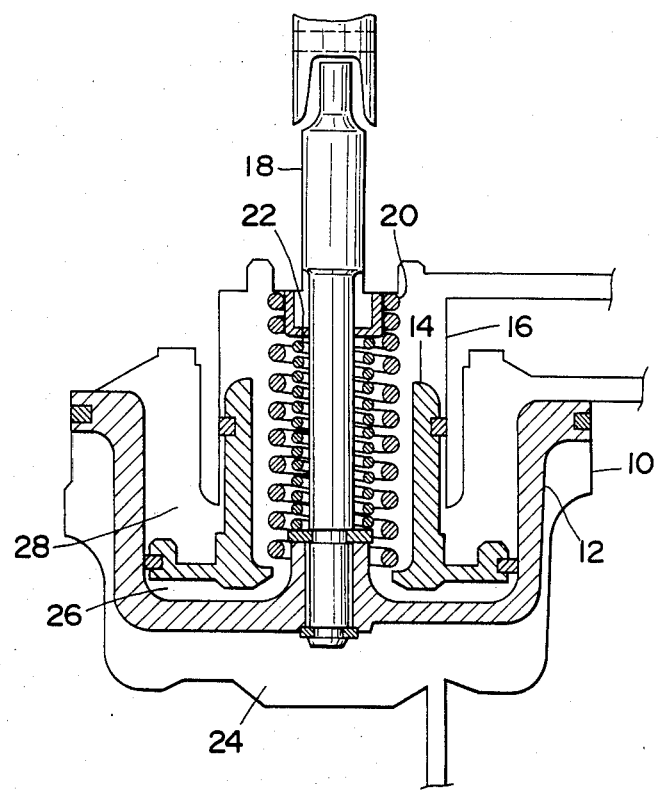
FIG. 1 is a sectional view of the prior art hydraulic servo device with built-in accumulator discussed above.
Figure 2:
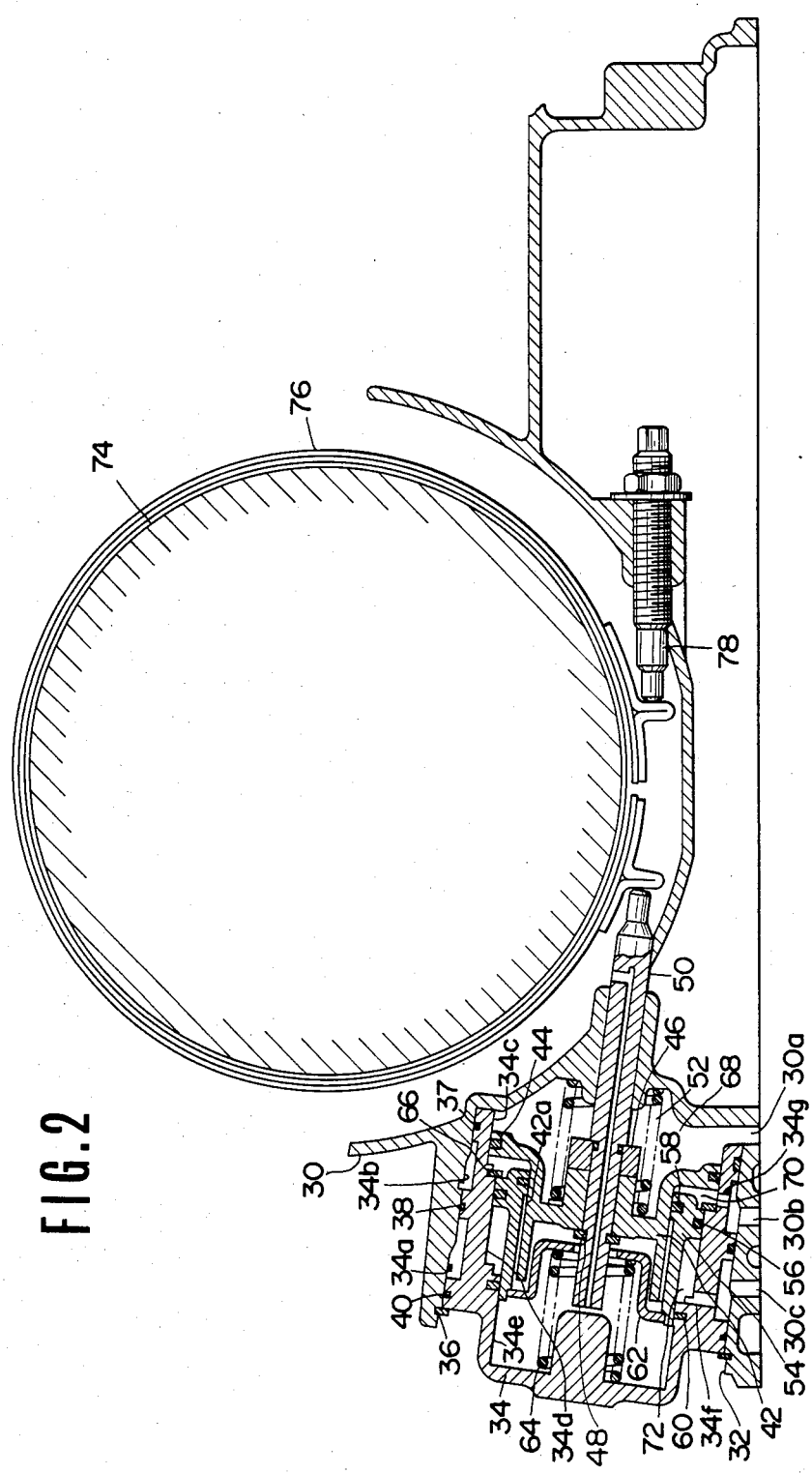
FIG. 2 is a cross sectional view of a band brake illustrating a preferred embodiment of a hydraulic servo device with a built-in accumulator according to the present invention.

Referring to FIG. 2, an embodiment according to the present invention is described.

FIG. 2 shows a hydraulic servo device with a built-in accumulator according to the present invention. Within a bore 32 with which a casing 30 of an automatic transmission is formed, a servo cylinder 34 is fit. The servo cylinder 34 is held in its proper position by a snap ring 36, and is formed with circumferentially extending grooves 34a and 34b. These grooves 34a and 34b are sealed from each other by means of O-rings 37, 38 and 40. The servo cylinder 34 includes three different inner diameter portions 34c, 34d and 34e having different diameters. Slidably fit in the inner diameter portion 34c is a large diameter outer diameter portion of a servo piston 42. A seal ring 44 is mounted on the large diameter outer diameter portion of the servo piston 42. With a retaining washer 46 and a washer 48, a stem 50 is firmly attached to the servo piston 42. A spring 52 is so arranged as to apply a return force to the servo piston 42.

Slidably fit in the inner diameter portion 34d of the servo cylinder 34 is a large diameter outer diameter portion of an accumulator piston 54. A seal ring 56 is arranged between them. The accumulator piston 54 has an inner diameter portion slidably fit around a small diameter outer diameter portion 42a of the servo piston 42. A seal ring 58 is arranged between them. The accumulator piston 54 has a small diameter outer diameter portion slidably fit in the inner diameter portion 34e of the servo cylinder 34. A seal ring 60 is arranged between them. A spring retainer 62 is integrally attached to the accumulator piston 54 and an accumulator spring 64 is arranged between this spring retainer 62 and the servo cylinder 34. Rightward movement, as viewed in FIG. 2, of the accumulator piston 52 beyond a predetermined point is prevented by a snap ring 66 mounted to the servo cylinder 34.

The casing 30 is formed with three conduits 30a, 30b and 30c. The conduit 30a communicates with a chamber 68 formed between the casing 30 and the servo piston 42, the conduit 30b communicates with the groove 34b of the servo cylinder 34, and the conduit 30c communicates with the groove 34a of the servo cylinder 34. The servo cylinder 34 is formed with holes 34f and 34g which communicate the grooves 34a and 34g with the inner diameter portions 34c and 34d, respectively. The hole 34g communicates with a chamber 70 formed between the servo piston 42 and the accumulator piston 54. The hole 34f communicates with a chamber 72 formed between the accumulator piston 54 and the servo cylinder 34. The stem 50 attached to the servo piston 42 is operatively connected to a band brake 76 around a drum 74 in such a manner as to engage the band brake 76 with the drum 74. Reaction taking place on the band brake 76 is taken up by an anchor bolt 78 firmly attached to the casing 30.

Now, the operation of this embodiment is described. The conduit 30a is connected to a servo release pressure circuit of the hydraulic control system, the conduit 30b is connected to a servo apply pressure circuit and the conduit 30c is connected to a line pressure circuit which provides an accumulator pressure. Let it assume that the band brake 76 is applied at the second speed ratio, during operation with the first speed ratio, no hydraulic fluid pressure is applied to the conduits 30a and 30b, and line pressure is applied to the conduit 30c only. In this case, the servo piston 42 and accumulator piston 54 assume the positions as illustrated in FIG. 2. If, in this state, the speed ratio switches to the second speed ratio in the hydraulic control system thereby to admit servo apply pressure to the conduit 30b, this hydraulic pressure is applied via the hole 34g to the chamber 70. The application of this hydraulic pressure creates a leftward force, as viewed in FIG. 2, to be applied to the accumulator piston 54. Although the accumulator piston 54 is subjected to a rightward force, as viewed in FIG. 2, due to hydraulic fluid pressure applied to the chamber 72, the accumulator piston 54 starts moving to the left, as viewed in FIG. 2, compressing the accumulator spring 64 because pressure acting area of the chamber 70 is larger than pressure acting area of the chamber 72. The hydraulic fluid pressure within the chamber 70 increases at a gradual rate while the accumulator piston 54 is moving, and then rises sharply after the accumulator piston 54 has completed its stroke. The same hydraulic fluid pressure as in the chamber 70 is applied to the servo piston 42, biasing the servo piston 42 with a rightward force as viewed in FIG. 2. This rightward force acting on the servo piston 42 also varies with variation in the hydraulic fluid pressure within the chamber 70 so that the force applied to the band brake 76 via the stem 50 increases at the gradual rate initially and increases sharply after the accumulator piston 54 has completed its stroke. Thus, the application of the band brake 76 is effected gradually, alleviating shift shocks in shifting from the first to second speed ratio. When the band brake 76 is to be released for establishing the third speed ratio, for example, servo release pressure is supplied to the conduit 30a with servo apply chamber kept supplied to the conduit 30b. The servo release pressure within the conduit 30a is applied to the chamber 68, applying a leftward force, as viewed in FIG. 2, to the servo piston 42. The hydraulic fluid pressure within the chamber 68 acts on the whole cross sectional area of the servo piston 42 so that the servo piston 42 moves to the left as viewed in FIG. 2 thereby to release the band brake 76 although there remains the servo apply pressure acting in the chamber 70.

In order to provide effective dampening of hydraulic fluid pressure by accumulator, it is preferrable to increase the volume of accumulator and precisely adjust orifice diameter at inlet to the accumulator. In the case of the hydraulic servo device with built-in accumulator according to the present invention, a desired accumulator effect is obtained because the construction wherein the accumulator piston 54 is arranged around the small diameter outer diameter portion 42a of the servo piston 42 ensures a sufficient large volume or effective pressure acting area for each of the chamber 70 where the servo apply pressure acts and the chamber 72 where the accumulator pressure acts.

As previously described, a hydraulic servo device with a built-in accumulator according to the present invention provides a large volume for accumulator within a limited size of the device, thus providing an accumulator effect as desired.

What is claimed:

1. A hydraulic servo device with a built-in accumulator, comprising:
    a servo cylinder formed with a first inner diameter portion, a second inner diameter portion and a third inner diameter portion, said first inner diameter portion having the largest diameter, said second inner diameter portion having a diameter larger than said third inner diameter portion and said third inner diameter portion having the smallest diameter;
    a servo piston having a large diameter outer diameter portion fit in said first inner diameter portion of said servo cylinder and a small diameter outer diameter portion;
    an accumulator piston having a large diameter outer diameter portion fit in said second inner diameter portion of said servo cylinder and a small diameter outer diameter portion fit in said third inner diameter portion of said servo cylinder, said accumulator piston having an inner diameter portion fit around said small diameter outer diameter portion of said servo piston; and
    an accumulator piston spring biasing the accumulator piston toward said servo piston;
    said large diameter outer diameter portion of said servo piston cooperating with said first inner diameter portion of said servo cylinder to define a first pressure acting area which is adapted to receive a servo release pressure;
    said large diameter outer diameter portion of said servo piston and said small diameter outer diameter portion thereof defining therebetween a second pressure acting area which is adapted to receive a servo apply pressure;
said large diameter outer diameter portion of said accumulator piston and said small diameter outer diameter portion thereof defining therebetween a third pressure acting area which is adapted to receive an accumulator pressure.

* * * * *